United States Patent [19]
Joyner et al.

[11] Patent Number: 5,272,203
[45] Date of Patent: Dec. 21, 1993

[54] HIGH PERFORMANCE TIRE TREADS AND TIRES

[75] Inventors: Dwayne A. Joyner, Canal Fulton; Jung W. Kang, Clinton; Takatsugu Hashimoto; Kazuaki Yuto, both of Akron; Bonnie L. Stuck, Uniontown, all of Ohio

[73] Assignees: Bridgestone/Firestone, Inc., Akron, Ohio; Bridgestone Corporation, Tokyo, Japan

[21] Appl. No.: 586,065
[22] Filed: Sep. 21, 1990
[51] Int. Cl.⁵ .............................................. C08L 9/06
[52] U.S. Cl. .................................... 524/575; 524/474; 526/173; 526/340
[58] Field of Search ................. 524/575; 526/173, 340
[56] References Cited

U.S. PATENT DOCUMENTS

| | | | |
|---|---|---|---|
| 2,964,083 | 12/1960 | Pfau et al. | 152/330 |
| 3,135,716 | 6/1964 | Uraneck et al. | 260/45.5 |
| 3,159,587 | 12/1964 | Ureneck et al. | 252/431 |
| 3,193,590 | 7/1965 | Hseik | 260/665 |
| 3,296,150 | 1/1967 | Kabu | 252/431 |
| 3,303,225 | 2/1967 | Hsieh et al. | 260/665 |
| 3,377,404 | 4/1968 | Zelinski | 260/680 |
| 3,438,957 | 4/1969 | Hsieh | 260/94.1 |
| 3,640,899 | 2/1972 | Naylor | 252/431 R |
| 3,644,322 | 2/1972 | Farrer | 260/94.2 |
| 3,668,263 | 6/1972 | Morrison et al. | 260/665 R |
| 3,725,368 | 4/1973 | Morrison et al. | 260/84.7 |
| 3,769,267 | 10/1973 | Cheng et al. | 260/83.7 |
| 3,784,637 | 1/1974 | Farrer | 260/448.2 G |
| 3,787,510 | 1/1974 | Farrer | 260/665 R |
| 3,886,127 | 5/1975 | Furukawa et al. | 260/82.1 |
| 3,903,168 | 9/1975 | Foss et al. | 260/583 R |
| 3,954,894 | 5/1976 | Kamienski et al. | 260/665 R |
| 3,975,453 | 8/1976 | Smith | 260/665 R |
| 3,984,387 | 10/1976 | Liu et al. | 526/74 |
| 4,028,484 | 6/1977 | Morton et al. | 526/335 |
| 4,075,253 | 2/1978 | Horui et al. | 260/665 R |
| 4,189,555 | 2/1980 | Massoubre | 526/179 |
| 4,196,154 | 4/1980 | Tung et al. | 260/665 R |
| 4,201,848 | 5/1980 | Kotani et al. | 525/314 |
| 4,339,397 | 7/1982 | Ishihara et al. | 260/665 R |
| 4,399,078 | 8/1983 | Morrison | 260/663 R |
| 4,413,098 | 11/1983 | Hattori et al. | 525/314 |
| 4,429,091 | 1/1984 | Hall | 526/181 |
| 4,471,093 | 9/1984 | Furukawa et al. | 525/237 |
| 4,497,748 | 2/1985 | Vitus et al. | 260/665 R |
| 4,572,263 | 2/1986 | Ogawa et al. | 152/537 |
| 4,677,165 | 6/1987 | Kikuchi et al. | 525/332.9 |
| 4,748,199 | 5/1988 | Takiguchi et al. | 524/318 |
| 4,782,119 | 11/1988 | Tsutsumi et al. | 525/314 |
| 4,791,178 | 12/1988 | Fujimaki et al. | 525/332.6 |
| 4,822,530 | 4/1989 | Bronstert et al. | 260/665 R |
| 4,826,911 | 5/1989 | Suzuki et al. | 524/526 |
| 4,835,209 | 5/1989 | Kitagawa et al. | 524/507 |
| 4,835,216 | 5/1989 | Morikawa et al. | 525/77 |
| 4,859,748 | 8/1989 | Priddy et al. | 526/88 |
| 4,866,131 | 9/1989 | Fujimaki et al. | 525/96 |
| 4,871,794 | 10/1989 | Itoh et al. | 524/254 |

FOREIGN PATENT DOCUMENTS 171935 7/1984 European Pat. Off. .
63101440 10/1986 Japan .

OTHER PUBLICATIONS

Rempp et al., Synthesis of Model Macromolecules, Anionic Polymerization, ACS, 1981, 59-70.
H. E. Adams et al., in Kautschuk and Gummi, Kunststofe, 18, Jahrgang, pp. 709-716, Nr, Nov. 1965.
Makowski et al., J. Macromol. Sci.-Chem., F2(4), pp. 683-700, Jul., 1968.

*Primary Examiner*—Paul R. Michl
*Assistant Examiner*—Edward J. Cain
*Attorney, Agent, or Firm*—Daniel N. Hall

[57] ABSTRACT

High-performance tires comprising treads made of elastomer compositions comprising (A) ultra high molecular weight copolymer compositions of 1,3-conjugated dienes and aromatic vinyl compounds having a weight average molecular weight of greater than about 1,000,000; (B) extender oil; and (C) carbon black are described. The ultra high molecular weight copolymer compositions which are also characterized as having an intrinsic viscosity in tetrahydrofuran of at least about 4.0 may be obtained by a process which comprises polymerizing a 1,3-conjugated diene and a vinyl aromatic compound in a hydrocarbon solvent in the presence of a trimetalated 1-alkyne catalyst which comprises the reaction product of a 1-alkyne containing at least 4 carbon atoms, an organo metallic compound $R^oM$ and a 1,3-conjugated diene wherein $R^o$ is a hydrocarbyl group, M is an alkali metal, the mole ratio of $R^oM$ to 1-alkyne is about 3:1 and the mole ratio of conjugated diene to 1-alkyne is from about 2:1 to about 30:1.

28 Claims, 1 Drawing Sheet

HIGH PERFORMANCE TIRE TREADS AND TIRES

TECHNICAL FIELD OF THE INVENTION

This invention relates to high performance tires comprising treads made of elastomer compositions comprising ultra high molecular weight copolymers of conjugated dienes such as 1,3-butadiene and aromatic vinyl compounds such as styrene. More particularly, this invention relates to tire treads made of such compositions wherein the copolymers are prepared using a trimetalated 1-alkyne catalyst.

BACKGROUND OF THE INVENTION

Various polymers have been used to prepare tire treads and to improve the properties and performance of the treads. High performance tires for general as well as special purposes generally are characterized as having improved traction, improved handling, lower wear and higher heat resistance than standard passenger tires. Accordingly, high performance tires will include treads made from compounds which generally have the following properties: high hysteresis loss, high tensile strength, low durometer, low viscosity, high thermal resistance, skid resistance, etc. High performance tires are useful in automobiles and motorcycles for highway or track use.

The polymerization of conjugated dienes such as 1,3-conjugated dienes to form elastomeric homopolymers and copolymers utilizing various initiator systems is known. For example, such polymerizations can be initiated with organometallic compounds wherein the metal is a Group I metal such as lithium. These polymers and copolymers of conjugated dienes are useful for tire rubbers, molded rubber goods, molding compounds, surface coatings, etc.

Various organometallic compounds have been described in the literature as useful in the polymerization and copolymerization of conjugated dienes. Among the catalysts which have been proposed are various alkali metal acetylides. For example, U.S. Pat. No. 3,303,225 describes the use of metalated 1-acetylenes as active catalysts in the polymerization of vinylidene-containing monomers. Alkali metal acetylides containing one or more metal atoms are prepared by reacting an organo alkali metal compound with an acetylene under conditions to effect step-wise replacement of, first, the acetylenic hydrogen atom, and, second, the hydrogen atoms attached to the carbon atom which is alpha to the acetylenic linkage.

U.S. Pat. No. 4,677,165 describes rubber compositions useful particularly for tire treads which comprise: a styrene-butadiene copolymer rubber prepared by random copolymerization of styrene with 1,3-butadiene by solution polymerization techniques utilizing an organic lithium compound as catalyst; from 80 to 250 phr of carbon black having a surface area of 100 to 400 m$^2$/g; and 30 to 280 phr of an aromatic oil. It is essential that the styrene-butadiene copolymer satisfies six requirements as identified in the specification and claims including the presence of one or more specific groups introduced into a molecular terminal or chain of the copolymer.

U.S. Pat. No. 2,964,083 describes curable rubber tire tread stock and pneumatic tires having a tread portion made of such stock. The tread stock comprises a copolymer containing a major amount of a conjugated diolefinic compound and a minor amount of a copolymerizable monoolefinic compound such as styrene, a fine reinforcing high abrasion carbon black and at least 30 parts by weight of a compatible soft oil per 100 parts by weight of the copolymer.

Styrene-butadiene elastomers comprising blends of different styrene-butadiene copolymers are described as being useful for treads of high performance tires in U.S. Pat. No. 4,866,131. The elastomers can be extended with oil to increase the hysteresis loss value. Aromatic oils having a viscosity gravity constant according to ASTM D-2501 in the range of 0.900 to 1.100 are described as suitable. The use of a low temperature plasticizer ester and/or a naphthenic or paraffinic softener to improve the properties of carbon black filled styrene-butadiene rubbers is described in U.S. Pat. No. 4,748,199.

U.S. Pat. No. 4,791,178 describes rubber compositions for use in tires which comprise certain mixtures of copolymers of a conjugated diene and monovinyl aromatic hydrocarbons. To obtain high hysteresis loss, the patentees suggest that an extender oil be blended into rubber compositions in amounts of from 30–200 parts by weight based on 100 parts by weight of the rubber component. Amounts of from 50 to 200 parts of oil are preferred. The use of 60 to 200 parts by weight of carbon black having an average particle size of not more that 300 Å also is disclosed as producing rubber composition with high hysteresis loss.

SUMMARY OF THE INVENTION

High performance tires are described herein which comprise treads made of elastomer compositions comprising ultra high molecular weight copolymer compositions of 1,3-conjugated dienes and aromatic vinyl compounds having a weight average molecular weight of greater than about 1,000,000. The ultra high molecular weight copolymer compositions which are also characterized as having an intrinsic viscosity in tetrahydrofuran of at least about 4.0 may be obtained by a process which comprises polymerizing a 1,3-conjugated diene and a vinyl aromatic compound in a hydrocarbon solvent in the presence of a trimetalated 1-alkyne catalyst which comprises the reaction product of a 1-alkyne containing at least 4 carbon atoms, an organo metallic compound R$^o$M and a 1,3-conjugated diene wherein R$^o$ is a hydrocarbyl group, M is an alkali metal, the mole ratio of R$^o$M to 1-alkyne is about 3:1 and the mole ratio of conjugated diene to 1-alkyne is from about 2:1 to about 30:1. Tire treads prepared from such vulcanizable elastomer compositions exhibit high tensile strength, high wear resistance, high mechanical strength and high gripping ability.

DESCRIPTION OF THE PREFERRED EMBODIMENTS

The elastomer compositions useful in preparing the treads of the performance tires of the present invention comprise an ultra high molecular weight copolymer composition of 1,3-conjugated dienes and aromatic vinyl compounds having a weight average molecular weight of greater than about 1,000,000. Optionally, and preferably, the thread composition also comprises an extender oil and carbon black. In preferred embodiments, the elastomer compositions of the present invention will contain large amounts of oil such as from about 30 or 50 parts to about 300 parts by weight of oil per 100 parts by weight of the copolymer (A), and up to about 250 parts by weight of at least one reinforcing carbon black per 100 parts of the copolymer composition (A).

(A) ULTRA HIGH MOLECULAR WEIGHT COPOLYMERS

The copolymers useful in the present invention are of the type generally referred to as ultra high molecular weight copolymer compositions. In particular, the copolymer compositions are obtained by copolymerizing 1,3-conjugated dienes with aromatic vinyl compounds. The ultra high molecular weight copolymer compositions obtained in accordance with the present invention are essentially free of gel and are further characterized as having a weight average molecular weight of greater than about 1,000,000. Ultra high molecular weight copolymer compositions can be prepared by the method having a weight average molecular weight of greater than 1,100,000. Other characterizing features of the ultra high molecular weight copolymers include inherent viscosity, dilute solution viscosity and percent relaxation as determined using a Mooney viscometer. In one embodiment, the copolymer compositions are characterized as having an intrinsic viscosity ($\eta$) in tetrahydrofuran of at least 4.0, and in another embodiment, the copolymers have an intrinsic viscosity in tetrahydrofuran of at least about 4.5.

The ultra high molecular weight compositions useful in the invention may also be characterized in terms of percent relaxation as determined by a procedure which will be discussed more fully below. In one embodiment, the compositions are characterized by percent relaxation values of at least about 30% to 100%, and more particularly relaxations of from about 30% to about 70%.

The ultra high molecular weight compositions also may be characterized as having a dilute solution viscosity in toluene of at least about 3.5 dl/g, and in one embodiment, the copolymers will have a dilute solution viscosity of at least about 4.0 dl/g. The ultra high molecular weight copolymers generally will be characterized by an Mw/Mn of at least about 1.9, more often, between about 2.0 or 2.5 and 5.0. The Mooney viscosity (ML$_{1+4}$ @ 100° C.) of the copolymers is greater than 200.

The copolymer compositions also may be characterized by their molecular weight distribution. The copolymer compositions contain a large fraction of copolymer having a number average molecular weight of greater than 1,000,000 and a small fraction of copolymer having a number average molecular weight of less than 100,000. In one embodiment of the present invention, the copolymer is characterized as comprising at least 30%, preferably more than about 35% by weight of a fraction having a number average molecular weight of greater than 1,000,000, and less than 8% by weight, preferably less than 5% by weight, of a fraction having a number average molecular weight of less than 100,000. The glass transition temperature of the copolymers is generally greater than about −60° C. and more often is greater than about −55° C. Ranges of −50° C. to −10° C. or 0° C. are also useful.

The copolymer compositions useful in the present invention are copolymers of a 1,3-conjugated diene monomer and an aromatic vinyl monomer. The relative amount of conjugated diene and aromatic vinyl monomers included in the copolymers may be varied over a wide range depending upon the desired copolymer properties. Thus, the amount of conjugated diene in the copolymer may vary from 10 to about 90% by weight and the amount of aromatic vinyl compound from about 10 to about 90% by weight. In one embodiment, the copolymers will comprise from about 50 to about 70% by weight of the conjugated diene and from about 30 to about 50% by weight of the aromatic vinyl compound.

Monomers

The conjugated diene monomers useful in preparing the copolymers generally are 1,3-dienes, and they contain from 4 to 12 carbon atoms and preferably from 4 to 8 carbon atoms per molecule. Examples of these dienes include the following: 1,3-butadiene, isoprene, 2,3-dimethyl-1,3-butadiene, 1,3-pentadiene(piperylene), 2-methyl-3-ethyl-1,3-butadiene, 3-methyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-butadiene, 2,3-di-n-propyl-1,3-butadiene, 2-methyl-3-isopropyl-1,3-butadiene, and the like. Among the dialkyl butadienes, it is preferred that the alkyl groups contain from 1 to 3 carbon atoms. Conjugated dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene.

The aromatic vinyl compounds include styrene, 1-vinyl-naphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include p-methylstyrene, alpha-methylstyrene, 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 2,3,4,5-tetramethylstyrene, 4-(4-phenyl-n-butyl)styrene, 3-(4-n-hexylphenyl)styrene, 4-methoxystyrene, 3,5-diphenoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinyl-naphthalene, 2,4-diisopropyl-1-vinyl-naphthalene, 3,4,5,6-tetramethyl-1-vinylnaphthalene, 3,6-di-n-hexyl-1-vinylnaphthalene, 8-phenyl-1-vinyl-naphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2-vinylnaphthalene, 6-benzyl-2-vinylnaphthalene, 3-methyl-5,6-diethyl-8-n-propyl-2-vinylnaphthalene, 4-p-tolyl-2-vinylnaphthalene, 5-(3-phenyl-n-propyl)-2-vinylnaphthalene, 4-methoxy-1-vinylnaphthalene, 6-phenoxyl-1-vinylnaphthalene, 3,6-dimethylamino-1-vinylnaphthalene, and the like. Other examples of vinyl substituted aromatic compounds are found in U.S. Pat. No. 3,377,404, the disclosure with respect to which is incorporated herein by reference. Preferred aromatic vinyl compounds include the styrenes, particularly, styrene.

Preferred copolymers are those obtained from 1,3-butadiene, isoprene or piperylene with styrene. More particularly, copolymers of 1,3-butadiene and styrene are preferred.

Catalyst

In one embodiment, the ultra high molecular weight copolymers useful in the present invention are obtained by polymerizing a 1,3-conjugated diene and an aromatic vinyl compound in the presence of a catalyst which is a trimetalated 1-alkyne. The trimetalated 1-alkyne catalysts are characterized by the formula (I)

wherein R is a hydrocarbyl group, M is an alkali metal, $R^1$ is a divalent oligomeric hydrocarbyl group comprising moieties derived from a 1,3-conjugated diene, and the total number moieties derived from a 1,3-conjugated diene in all of the $R^1$ groups in Formula I is from about 2 to about 30.

The hydrocarbyl group R may be a saturated aliphatic, saturated cycloaliphatic or an aromatic group generally containing up to about 20 carbon atoms. In one embodiment, R is an alkyl group containing from 1 to 15 carbon atoms. In another embodiment, R is an alkyl group containing 1 to 6 carbon atoms. In yet another embodiment, R is an alkyl group containing from about 3 to 9 carbon atoms. M is an alkali metal including lithium, sodium, potassium, rubidium, cesium and francium. Lithium, sodium and potassium are preferred alkali metals, and lithium is the most preferred alkali metal.

The substituent $R^1$ is a divalent oligomeric hydrocarbyl group comprising moieties derived from a 1,3-conjugated diene. The conjugated dienes may be any of a variety of 1,3-conjugated dienes including those containing from 4 to 12 carbon atoms, and preferably from 4 to 8 carbon atoms per molecule. Specific examples of the conjugated dienes include: 1,3-butadiene; isoprene; 2,3-dimethyl-1,3-butadiene; 1,3-pentadiene(piperylene); 2-methyl-3-ethyl-1,3-butadiene; 3-methyl-1,3-pentadiene; 1,3-hexadiene; 2-methyl-1,3-hexadiene; 1,3-heptadiene; 1,3-octadiene; etc. In one preferred embodiment, the moieties of the oligomeric group $R^1$ are derived from 1,3-butadiene, isoprene or piperylene.

The number of moieties derived from a conjugated diene in the $R^1$ groups of the composition of Formula I may be varied over a range of from 2 to about 30. Generally, the total number of moieties derived from a conjugated diene in the two $R^1$ groups in the composition of Formula I is from about 3 to about 30. In one preferred embodiment, the total number of conjugated diene derived moieties in all of the $R^1$ groups in the composition of Formula I is from about 8 to about 20. The number of moieties derived from a conjugated diene in the oligomeric groups $R^1$ can be varied to provide compositions of Formula I having a weight average molecular weight of from about 200 to about 3000. In one preferred embodiment, the weight average molecular weight of the compositions of Formula I is within a range of from about 800 to about 2000. The hydrocarbon-soluble trimetalated 1-alkyne compositions characterized by Formula I can be obtained by reacting a 1-alkyne containing at least 4 carbon atoms, an organometallic compound R°M, and a conjugated diene at a temperature above about 70° C., wherein the mole ratio of R°M to 1-alkyne is about 3:1. The 1-alkyne may be represented by the formula (II)

wherein R is a hydrocarbyl group. Representative examples of such 1-alkyne compounds include 1-butyne; 1-hexyne; 1-octyne; 1-decyne; 1-dodecyne; 1-hexadecyne; 1-octadecyne; 3-methyl-1-butyne; 3-methyl-1-pentyne; 3-ethyl-1-pentyne; 3-propyl-6-methyl-1-heptyne; 3-cyclopentyl-1-propyne; etc.

The organometallic compound may be represented by the formula R°M wherein R° is a hydrocarbyl group which may be a saturated aliphatic group, a saturated cycloaliphatic group, or an aromatic group. Generally, R° will contain up to about 20 carbon atoms. M is an alkali metal including lithium, sodium, potassium, rubidium, cesium and francium. Representative examples of the organometallic compound R°M include: methylsodium, ethyllithium; propyllithium; isopropylpotassium, n-butyllithium, s-butyllithium; t-butylpotassium; t-butyllithium; pentyllithium; n-amylrubidium; tert-octylcesium; phenyllithium; naphthyllithium; etc. The conjugated dienes which are reacted with the intermediate to form the desired compositions are preferably 1,3-conjugated dienes of the type which have been described above.

In a preferred embodiment, the trimetalated 1-alkyne catalysts are prepared by the method which comprises the steps of (a) reacting a 1-alkyne with an organometallic compound R°M in a mole ratio of about 1:3 to form an intermediate, and (b) reacting said intermediate with a conjugated diene at a temperature of at least about 70° C. The mole ratio of conjugated diene to 1-alkyne in the reaction is at least about 2:1 and may be as high as about 30:1. More generally, the ratio will be in the range of from about 8:1 to 20:1.

The reaction of the 1-alkyne with the organometallic compound followed by reaction with the conjugated diene can be carried out in the presence of an inert diluent, and particularly, in the presence of a hydrocarbon such as an aliphatic, cycloaliphatic or aromatic hydrocarbon. Representative examples of suitable hydrocarbon diluents include n-butane, n-hexane, isooctane, decane, dodecane, cyclohexane, methylcyclohexane, benzene, toluene, xylene, etc. Preferred hydrocarbons are aliphatic hydrocarbons containing from four to about 10 carbon atoms per molecule. Mixtures of hydrocarbons can also be utilized.

The reaction between the 1-alkyne and the organometallic compound to form the intermediate can be effected at temperatures of 20°-30° C., and the reaction is generally conducted in an inert atmosphere such as under nitrogen. The reaction generally is conducted at atmospheric pressure. The intermediate obtained from the first step is a trimetalated alkyne which is either insoluble or only slightly soluble in hydrocarbons.

The reaction between the intermediate and the conjugated diene to form a hydrocarbon soluble product is conducted at a temperature above 70° C. and more generally at a temperature of from about 70° C. to about 150° C. The reaction generally is completed in less than about 5 hours, and the reaction results in a change in the color of the solution from a yellow to red or reddish brown. At about 80° C. the reaction is completed in about 3 hours. At higher temperatures, the reaction is completed in less than 3 hours. If the reaction mixture is heated for too long a period, the catalytic activity of the resulting product may be reduced. The product of this reaction is a trimetalated alkyne containing two divalent oligomeric hydrocarbyl groups comprising moieties derived from the conjugated diene. Relatively small amounts of the conjugated diene are reacted with the intermediate in the second step. The mole ratio of conjugated diene to 1-alkyne in the intermediate is at least about 2:1 and may be as high as 30:1. In one preferred embodiment, the mole ratio of conjugated diene to 1-alkyne is in a range of from about 8:1 to about 20:1.

The trimetalated compounds used in this invention contain active as well as inactive metal. The presence of at least two different types of carbon metal linkages in the compositions of this invention can be shown by both chemical and physical evidence. Gilman titration with allyl bromide distinguishes between metal acetylide (—C≡C—M) which is inactive and other carbon metal linkages (—C—C—M) which are active, *J. Organometal Chem.*, 1(1963) 8. Titration of the compositions of this invention show about 67% of the total carbon-metal linkages are "active" corresponding to trimetalated alkynes. Ultraviolet and visible spectral studies show peak absorbances at 300-340 NM and 400-450 NM for the compositions of this invention corresponding to inactive and active metal linkages, respectively.

An important property of these catalyst compositions is that they are soluble in hydrocarbon solvents. The terms "soluble in hydrocarbon solvents" and "hydrocarbon soluble" as used in the specifications and claims indicate that the materials (polymer) are soluble in hydrocarbons, particularly aliphatic hydrocarbons such as n-hexane, to the extent of at least about 5 grams of material per 100 grams of solvent at about 25° C. The solutions are stable in an inert atmosphere at room temperature for an extended period of time.

The following examples illustrate the preparation of the hydrocarbon soluble trimetalated 1-alkyne compositions useful as catalysts in the present invention. Additional examples of useful catalysts are found in copending U.S. application Ser. No. 07/586,058 (Inventors J. W. Kang, G. B. Seaver, and T. Hashimoto) filed the same day as this application. The disclosure of this co-pending application is hereby incorporated by reference for its description of additional catalysts.

Unless otherwise indicated in the following examples and elsewhere in the specification and claims, all parts and percentages are by weight, temperatures are in degrees centigrade and pressure is at or near atmospheric pressure.

EXAMPLE A

To a solution of 0.55 ml. of 1-octyne (3.73 mM) in dry hexane contained in a 7-ounce bottle equipped with rubber liner and three-hole crown cap are charged 7 ml. of n-butyllithium (11.2 mM, 1.6M solution) through a disposable syringe at room temperature under nitrogen. The resulting slurry is shaken vigorously to complete the reaction, and the resulting pale yellow solution is allowed to stand at room temperature for one hour. To this solution is charged 25 gms. of 1,3-butadiene in hexane (24.2% butadiene, 112 mM butadiene). The mixture is tumbled in a bath heated to about 80° C. for three hours, and the resulting reddish brown solution is cooled and stored. Analysis of the solution obtained in this manner but the Gilman technique indicates active carbon-lithium linkage of 63.6%. The calculated active carbon-lithium linkage based on 1,3,3-trilithio-octyne is 66.7%.

EXAMPLE B

To a one-gallon reactor equipped with thermometer, stirrer, heating means, pressure means, inlet and outlet ports are charged 450 gms. of dry hexane, 436 gms. (1008 mM) of n-butyllithium (1.54M) in hexane, and a solution of 37 gms. (336.3 mM) of 1-octyne in 35 gms. of dry hexane. The reaction mixture is maintained under a nitrogen atmosphere as the n-butyllithium and octyne are added to the reactor. After the above ingredients are added to the reactor, the mixture is stirred at room temperature for 30 minutes under nitrogen, and 816.5 gms. of a 1,3-butadiene/hexane blend containing 200 gms. of 1,3-butadiene are added to the reactor. This mixture is stirred at 85° C. for 120 minutes whereupon a homogeneous reddish-brown solution is obtained. This solution is allowed to cool to room temperature and transferred to storage tank under a nitrogen atmosphere. Gilman's titration indicates the presence of 62.34% active carbon-lithium linkages at 0.2628 molarity. The calculated active carbon-lithium linkage is 66.7%.

Two-hundred grams of the catalyst solution is coagulated with excess methanol in the presence of an antioxidant (e.g., 1% di-tertiary-butyl-para-cresol). The resulting oily product is dried at 50° C. under vacuum. Gel permeation chromatography analysis of the product indicates a 1123 Mw.

Polymerization

The copolymers useful in the present invention are prepared by polymerizing the conjugated diene and the vinyl aromatic compound in a hydrocarbon solvent in the presence of the above-described trimetalated 1-alkyne catalyst. The polymerization temperature may range from about 0° C. to about 160° C. or higher, but generally, the polymerization is conducted at a temperature of between about 75° C. and 150° C. for a period of from about 10 minutes to 2 or 3 hours. In a preferred embodiment, the polymerization is conducted at a temperature in the vicinity of about 100° C. for a period of about 15 minutes to one hour. The desired ultra high molecular weight copolymers can be obtained consistently at this relatively high temperature in a relatively short period of time. Effecting polymerization with about 100% conversion in one hour or less allows for more effective use of labor and equipment which represents a substantial savings in the commercial production of the copolymers. The copolymers may be random or block copolymers, but random copolymers are preferred.

The actual temperature utilized in the polymerization reaction will depend upon the desired polymerization rate, the product desired, and the particular catalyst or catalyst system utilized. The polymerization may be conducted under a negative pressure or an elevated pressure to avoid a loss of monomer and solvent, particularly when the temperatures used are at or above the boiling point of either or both. Also, an inert atmosphere such as nitrogen can be used, and the usual precautions are taken to exclude materials such as water and air that will inactivate or poison the catalyst.

The polymerization reaction is generally conducted in a hydrocarbon solvent or diluent. Various hydrocarbon solvents can be used including aliphatic, cycloaliphatic and aromatic hydrocarbons. In one embodiment, aliphatic hydrocarbons such as hexane and cyclohexane are preferred. Examples of the aliphatic hydrocarbons useful as solvent/diluent in the polymerization reaction generally will contain from about 3 to about 20 carbon atoms, and more preferably from about 5 to about 10 carbon atoms. Examples of such aliphatic hydrocarbons include butane, pentane, hexane, heptane, octane, decane, etc. Cycloalkanes containing from 5 to 20 and preferably from 5 to about 10 carbon atoms also are useful. Examples of such cycloalkanes include cyclopentane, cyclohexane, methyl cyclohexane, and cycloheptane. Aromatic solvents which may be utilized include benzene, toluene and xylene. Individual diluents can be employed, or combinations of hydrocarbons such as a hydrocarbon distillate fraction may be utilized.

In many applications, it is desirable to increase the ratio of 1,2-structure (vinyl) in the copolymers in order to increase the cure rate in free radical cure systems. For example, in one preferred embodiment of this invention, the elastomer contains from about 15 to about 70% of 1,2 or vinyl units based on the amount of conjugated diolefin in the copolymers. Various compositions, referred to in the art as modifier compositions, can be included in the copolymerization mixture to increase the amount of 1,2-structure in the copolymers. Any of the modified compositions which have been described in the prior art which will combine with the trimetalated 1-alkyne catalyst of the present invention to produce ultra high molecular weight copolymers having increased amounts of 1,2-structure can be utilized in the method of the present invention. Modifier compounds which have been found to be particularly useful in combination with the trimetalated 1-alkyne catalyst are those described in copending U.S. application Ser. No. 07/586,058 (inventors: J. W. Kang, G. B. Seaver, and T. Hashimoto). The disclosure of this patent application relating to the modifier compounds is hereby incorporated by reference.

The amounts of trimetalated 1-alkyne catalyst and the optional modifier(s) utilized in the polymerization reaction are amounts designed to result in the formation of a copolymer having the desired properties described above. The amounts utilized in a particular copolymerization reaction will depend upon a number of factors including the types and amounts of monomers being copolymerized, the desired molecular weight and molecular weight distribution, etc. One of the desirable features of the catalyst used in the method of the invention is that only small amounts of the catalysts are required to produce the desired copolymer, and this results in a cost savings.

The millimole ratio of the catalyst to the weight of the monomers which is employed in the preparation of the copolymers is expressed as the number of millimoles of active metal in the catalysts based on metal per 100 grams of monomer (PHGM). In the trimetalated 1-alkyne catalyst of the present invention wherein the metals are in the 1,3,3-positions, the metal in the 1-position is inactive whereas the metals in the 3-position are active metals. Generally, the ratio of millimoles of active metal PHGM may range from about 0.4 to about 0.7. At the higher ratios, the weight average molecular weight of the copolymers of the present invention tends to decrease. Thus, in one preferred embodiment, the ratio of millimoles of active metal PHGM will range from about 0.45 to about 0.65.

The term 1,2-units or 1,2-microstructure as used in the present application refers to the mode of addition of a growing polymer chain with a conjugated diene monomer unit. Either 1,2-addition or 1,4-addition can occur. In terms of nomenclature, this results in a 1,2-unit or microstructure for the monomer unit in the polymer chain when 1,3-butadiene is a monomer. When isoprene is the monomer, 3,4-microstructure most generally results with a smaller amount of 1,2-microstructure in the polymer chain. Naming of the polymer structure which results from 1,2-addition is thus dependent on the monomers being polymerized. For simplicity, the term 1,2-unit or 1,2-microstructure is employed to determine the microstructure which results from 1,2-addition of conjugated dienes. The microstructure of the ultra high molecular weight copolymers of the present invention is determined using proton NMR. The copolymers useful in this invention can be prepared containing relatively high amounts of 1,2 units (vinyl) such as from 10 to 80% by weight of 1,2 units. In one preferred embodiment the copolymers contain from about 15 to about 50% of 1,2 or vinyl units based on the amount of butadiene incorporated into the copolymer (referred to as "butadiene base"). In another embodiment the copolymers will contain more 1,2-units such as from 60 to 80%.

Samples may be withdrawn from the reactor periodically during the polymerization reaction to determine percent conversion (by measuring the total solids), color and character of the reaction mass. The reaction time of the polymerization is dependent upon several factors including the polymerization temperature and the catalyst concentration. Generally complete conversion to polymer can be obtained at temperatures of about 100° C. in about 15 minutes to one hour.

When the polymerization reaction has progressed to the desired degree, the product can be dropped from the reactor or combined with an alcohol such as methanol or isopropanol, or other liquid medium which deactivates the initiator and coagulates and precipitates the polymer product. Generally, an amount of isopropanol equal in weight to the amount of diluent (e.g., hexane) used is sufficient to effect coagulation and precipitation. It is also customary and advantageous to include an antioxidant such as about 1% of di-tertiary butyl paracresol in the isopropanol. The polymer product is recovered and dried to remove solvent.

The molecular weights and the dilute solution viscosity (DSV) in toluene of the copolymers reported herein, are determined by techniques described in copending U.S. application Ser. No. 07/586,058 filed the same day as this application. The disclosures regarding molecular weight and DSV determinations are hereby incorporated by reference.

The intrinsic viscosity ($\eta$) of the copolymers used in the present invention is determined by the general procedure utilized for DSV except that the intrinsic viscosity is the average of four data points obtained with four different concentrations.

The glass transition temperature (Tg) of the copolymers used in the present invention is determined using a DuPont 1090 thermal analyzer with a 910 Differential Scanning Calorimeter System and following the manufacturer's recommended procedure. The onset, inflection and offset temperatures are calculated in accordance with the Interactive DSC Data Analysis-Program V2D.

Figure 1:
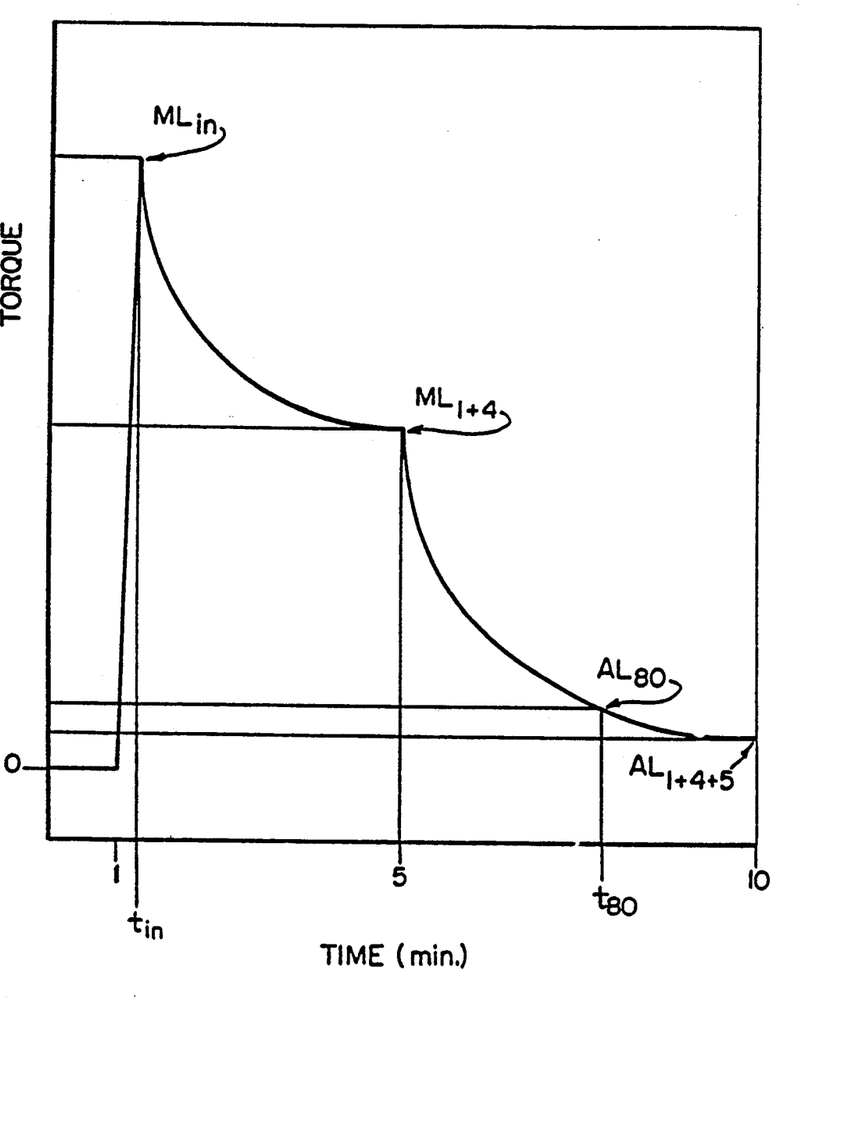
The drawing is a graph of torque versus time identifying the points ML$_{in}$, ML$_{1+4}$, AL$_{80}$ and AL$_{1+4+5}$ used in determining percent relaxation of the copolymers used in the invention.

The relaxation properties of the copolymers used in the present invention are determined using a Bendix Scott STI/200 Mooney Viscometer and a modification of the conventional method for measuring the "shearing viscosity" of rubber and rubber-like materials such as SBR. In this procedure, the sample is placed between the platens which are then closed. The sample is warmed at 100° C. for one minute, and the rotor is turned on. After four minutes, the Mooney value ($ML_{1+4}$) is determined and the rotor is turned off. Measurement of the relaxation is begun, and a relaxation time ($AL_{80}$) is recorded when the torque reaches 20% ($T_{80}$) of the Mooney value $ML_{1+4}$. After a total of 10 minutes, the torque is again observed and recorded as $AL_{1+4+5}$, and the platens are opened. The percent relaxation is calculated as follows:

$$\text{Percent relaxation} = \frac{AL_{1+4+5}}{ML_{1+4}} \times 100$$

A typical graph of the torque versus time for this test procedure is shown in the drawing wherein the various values utilized in computation of percent relaxation such as $ML_{1+4}$ and $AL_{1+4+5}$ are noted. In general, the copolymers used in the present invention are characterized by a percent relaxation as defined above of from about 20% to about 80%. More often, the percent relation will be between about 30 or even 40% and about 70%.

The following examples illustrate the copolymers useful in the present invention and methods for their preparation. Additional examples of copolymers are found in copending U.S. application Ser. No. 07/586,058 filed the same day as this application. The disclosure of this copending application is hereby incorporated by reference for its description of additional copolymers.

Unless otherwise indicated in the following examples and elsewhere in the specification and claims, values for number average molecular weight (Mn) and weight average molecular weight (Mw) are determined in tetrahydrofuran using GPC as described above. The microstructure of the copolymers (e.g., 1,4 units, 1,2 units, etc., is determined utilizing proton NMR in carbon disulfide.

EXAMPLES 1-5

To a two-gallon stainless steel reactor equipped with thermometer, stirrer, heating means, pressure means, inlet and outlet ports which is maintained under a nitrogen atmosphere, a styrene/butadiene/hexane blend as described in Table I is charged along with 19 ml. of a one normal solution of 2,2'-di(tetrahydrofuryl) propane in hexane (modifier), and 3.8 mM of the uncoagulated catalyst solution of Example B. The temperature of the mixture within the reactor is raised from room temperature to 100° C. The polymerization is conducted under the conditions listed in Table I. The resulting copolymer is coagulated with excess of isopropanol containing about 1% of di-tertiary butyl-para-cresol followed by drum drying. The copolymer obtained in each example and its properties are shown in Table I.

TABLE I

|  | 1 | 2 | 3 | 4 | 5 |
|---|---|---|---|---|---|
| STY./Bd/HEX., (g) | 4123 | 4123 | 4122 | 4122 | 4110 |
| % Total Solid | 19.4 | 19.4 | 19.3 | 19.3 | 19.3 |
| STY., Wt. % | 45.0 | 45.0 | 40.2 | 40.2 | 35.2 |
| Bd., Wt. % | 55.0 | 55.0 | 59.8 | 59.8 | 64.8 |
| Catalyst |  |  |  |  |  |
| Active Li,mM PHGM | 0.476 | 0.476 | 0.476 | 0.476 | 0.515 |
| Polymerization Conditions |  |  |  |  |  |
| Modif./Active Li | 2.5:1 | 2.5:1 | 2.5:1 | 2.5:1 | 2.5:1 |
| Init. Temp. (°C.) | 25 | 25 | 25 | 25 | 25 |
| Set Temp. (°C.) | 100 | 100 | 100 | 100 | 110 |
| Max. Temp. (°C.) | 123 | 118 | 128 | 130 | 146 |
| Pzn. Time (Min.) | 60 | 60 | 60 | 60 | 60 |
| % Conversion |  |  | ≧97.0% |  |  |
| Physical Properties |  |  |  |  |  |
| DSV in Toluene | 4.02 | 3.65 | 3.35 | 4.25 | 4.23 |
| % Gel | 0.00 | 0.00 | 0.00 | 0.00 | 0.00 |
| (η)THF | 5.08 | 4.38 | 4.08 | 5.45 | 5.49 |
| $Mn(\times 10^{-4})$ | 45.6 | 44.1 | 42.6 | 47.4 | 36.3 |
| $Mw(\times 10^{-4})$ | 161.3 | 149.1 | 136.3 | 159.5 | 135.1 |
| Mw/Mn | 3.53 | 3.38 | 3.20 | 3.37 | 3.72 |
| Microstructure |  |  |  |  |  |
| % 1,4 units | 18.9 | 21.3 | 21.4 | 21.5 | 28.0 |
| % 1,2 units | 32.9 | 31.0 | 36.6 | 35.8 | 33.9 |
| % 1,2 (Bd Base) | 63.5 | 59.3 | 63.1 | 62.5 | 54.8 |
| % STY. | 48.2 | 47.7 | 42.0 | 42.7 | 38.0 |
| % Block STY. | 0.0 | 0.0 | 0.0 | 0.0 | 0.0 |
| Tg (°C.) | −16.6 | −16.7 | −21.5 | −21.0 | −27.7 |

EXAMPLE 6

Example 1 is substantially repeated with the exception that the blend composition is varied in each polymerization. Hexane, styrene, 1,3-butadiene in the amounts shown in Table II are placed in a two gallon reactor under a nitrogen atmosphere. The polymerization is carried out for 60 minutes under the conditions shown in Table II.

TABLE II

|  | 6 |
|---|---|
| Polymerization Conditions |  |
| Hexane (g) | 3745 |
| Styrene (g) | 270 |
| 1,3-Butadiene (g) | 533 |
| Modifier (mM) | 7.40 |
| Initiator (mM) | 3.08 |
| Polymerization Temperature |  |
| Initiation Temp. (°C.) | 20 |
| Set Temp. (°C.) | 120 |
| Max. Temp. (°C.) | 140 |
| Polymerization Conversion (%) | 100 |
| Properties of Polymer |  |
| Wt. % Styrene | 35.7 |
| Wt. % 1,2(100% Bd Base) | 45.5 |
| $ML_{1+4}$ @ 100° C. | >200 |

EXAMPLES 7-9

Example 1 is substantially repeated with the exception that the blend composition is varied in each polymerization. The amounts of hexane, styrene and 1,3-butadiene and the reaction conditions are shown in Table III.

TABLE III

|  | 7 | 8 | 9 |
|---|---|---|---|
| Polymerization Conditions |  |  |  |
| Hexane (g) | 3745 | 3745 | 3745 |
| Styrene (g) | 270 | 270 | 270 |
| 1,3-Butadiene (g) | 533 | 533 | 533 |

TABLE III-continued

|  | 7 | 8 | 9 |
|---|---|---|---|
| Modifier (mM) | 8.68 | 5.20 | 8.70 |
| Active Li (mM) | 3.47 | 3.47 | 2.76 |
| Polymerization Temperature |  |  |  |
| Initiation Temp. (°C.) | 20 | 20 | 20 |
| Set Temp. (°C.) | 120 | 120 | 120 |
| Max. Temp. (°C.) | 134 | 137 | 140 |
| Polymerization Conversion (%) | 100 | 100 | 100 |
| Properties of Polymer |  |  |  |
| Wt. % Styrene | 36.1 | 35.5 | 35.4 |
| Wt. % 1,2(100% Bd Base) | 59.2 | 45.9 | 45.6 |
| Mn($\times 10^{-4}$) | 45.9 | 44.6 | 60.1 |
| Mw($\times 10^{-4}$) | 123.4 | 156.3 | 164.5 |
| Mw/Mn | 2.69 | 3.50 | 2.74 |
| $ML_{1+4}$ @ 100° C. | >200 | >200 | >200 |
| Tg (°C.) | −23.8 | −36.3 | −35.0 |

EXAMPLE 10

The general procedure of Example 1 is repeated except that the amount of styrene and 1,3-butadiene is varied. The properties of the copolymer thus obtained are summarized in the following Table IV. Also included in Table IV are properties of other SBR copolymers for comparison purposes. Controls 1 and 3 are solution SBRs. Control-2 is an emulsion SBR available from Ameripol under the designation E-1721.

TABLE IV

|  | 10 | Control-1 | Control-2 | Control-3 |
|---|---|---|---|---|
| % Styrene | 35.8 | 32.2 | 41.1 | 35.1 |
| % 1,2 (Butadiene base) | 42.4 | 33.4 | 18.1 | 25.0 |
| Mw($\times 10^{-4}$) | 109.0 | 74.9 | 81.9 | 67.4 |
| [η] THF | 5.44 | 2.46 | 3.39 | 2.60 |
| Tg (°C.) | −47.2 | −42.4 | −37.3 | −54.7 |

The elastomer component of elastomer compositions of the present invention may comprise a mixture of the copolymer (A) and at least one other material or synthetic rubber including other solution and emulsion SBRs. Thus in one embodiment, the elastomer component may comprise from about 10% to 100% by weight of the copolymer (A) described herein and from zero to about 90% by weight of another rubber. Examples of synthetic rubbers include rubber-like polymers produced by polymerizing aliphatic, conjugated diolefins, especially those containing 4 to 8 carbon atoms such as butadiene, isoprene pentadienes, etc. The rubbers contain unsaturated carbon chains, and such rubbers are known in the art as shown by ANSI/ASTM Standard D1418-79A where these rubbers are referred to as R rubbers. The following is a non-exclusive list of R class rubbers which can be used with the copolymer (A) elastomer in this invention.

ABR—Acrylate-butadiene
BR—Butadiene
CIIR—Chloro-isobutene-isoprene
CR—Chloroprene
IR—Isoprene, synthetic
NBR—Nitrile-butadiene
NCR—Nitrile-chloroprene
NIR—Nitrile-isoprene
NR—Natural rubber
SCR—Styrene-chloroprene
SIR—Styrene-isoprene rubbers Of these, the NR, IR, BR, or mixtures of two or more of these are typically used. Compositions containing the copolymer of this invention and NR as the rubber portion are often used. In the context of this invention, NR includes both hevea and guayule rubber as well as mixtures thereof.

The rubbers used herein having carbon-carbon unsaturation also may be other than the above-described R rubbers. Examples of such rubbers include EPDM and EPR. EPDM rubbers are derived from ethylene-propylenediene monomer and generally about 3 to 8% of their carbon bonds are unsaturated bonds.

(B) OIL

The vulcanizable elastomer compositions used in the present invention often and generally will contain oil which serves as an extender of the above-described copolymers. Any oil which is compatible with and capable of extending the ultra high molecular weight copolymer compositions can be used in the preparation of the elastomer compositions of the present invention. Thus, the oils may be either natural or synthetic oils provided that they are compatible with the copolymers and capable of extending the copolymers. Natural oils, and in particular, petroleum base oils such as mineral oils, are preferred types of oil useful in the present invention. The oils may be naphthenic oils, paraffinic or aromatic oils. These oils are substantially hydrocarbon oils, often hydrocarbon mineral oils, usually petroleum base oils. A number of specific useful oils are disclosed in U.S. Pat. No. 2,964,083, and in particular in Table 1 in columns 9-12 and in U.S. Pat. No. 4,748,199, column 5 lines 27-37. These patents are hereby incorporated by reference for their disclosure of specific oils useful as extenders in this invention.

The American Society for Testing and Materials has suggested and published the following classification for oil types (ASTM designation, D-2226).

| Types | Asphaltenes max., % | Polar Compounds max., % | Saturated Hydrocarbons, % |
|---|---|---|---|
| 101 | 0.75 | 25 | 20 max. |
| 102 | 0.5 | 12 | 20.1 to 35 |
| 103 | 0.3 | 6 | 35.1 to 65 |
| 104 | 0.1 | 1 | 65 min. |

The alternative classification of highly aromatic, aromatic, naphthenic, and paraffinic corresponds to the 101, 102, 103 and 104 types, respectively.

Most often, the oils will be blends comprising various mixtures of naphthenic, or paraffinic or aromatic oils. In one embodiment, the oil should have a boiling point above 230° C. and preferably above 290° C. Mineral oils having low aniline point or high aromatic content are preferred, particularly when the rubber contains high amounts of styrene and other aromatic components. Aromatic oils generally are characterized as having a viscosity gravity content (VGC) as determined by ASTM procedure D-2501 of from 0.900 to 1.100. Naphthenics and paraffinics generally have a VGC of less than 0.900.

The particular oil which is selected for blending with the copolymers will be determined by the intended use of the rubber article being produced. For example, where the tires are to be utilized in cold climates, it is desired that the rubber treads have low temperature flexibility, and this may be accomplished by utilizing hydrocarbon oils of low pour point. In such instances, the oils may have boiling points lower than the 230° C. indicated above. Preferred oils for extending the copolymers used in preparing the treads of the present invention are low volatile aromatic oils.

It has been discovered that the elastomers useful in the present invention comprising the above-described copolymers and oil can be prepared containing very large amounts of oil, and in particular, the elastomer compositions of the present invention can be prepared containing from 30 to about 300 parts of oil per 100 parts of copolymer without loss of desirable properties. Blends comprising 80, 100, 150 or even 250 parts of oil per 100 parts of copolymer are easily prepared and have been found to exhibit desirable and useful properties.

(C) CARBON BLACK

Carbon black fillers which may be included in the vulcanizable elastomers useful in this invention include any of the commonly available, commercially-produced carbon blacks but those having a surface area (EMSA) of at least 7 m$^2$/g and more preferably at least 35 m$^2$/g up to 200 m$^2$/g or higher are preferred. In one preferred embodiment the surface area of the carbon black is at least 80 m$^2$/g. Surface area values used in this application are those determined by ASTM test D-1765 using the cetyl-trimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following Table V.

TABLE V

| Carbon Blacks | |
|---|---|
| ASTM Designation (D-1765-82a) | Surface Area (m$^2$/g) (D-3765) |
| N-110 | 126 |
| N-220 | 111 |
| N-339 | 95 |
| N-330 | 83 |
| N-550 | 42 |
| N-660 | 35 |

High surface area, small particle size, high structure carbon blacks are preferred for use in the high performance tread compounds of this invention. Surface areas of at least about 80 m$^2$/g up to about 140 m$^2$/g are preferred in one embodiment. Examples of such blacks include SAF (N100-N199), ISAF (N200-N299) and FAF (N300-N399) blacks. Those carbon blacks designated HAF-HS and ISAF-HS are particularly useful.

Another measure of surface area is iodine adsorption as determined by ASTM D1510. Structure of carbon blacks is assessed by DBP absorption according to ASTM D2414. Carbon blacks having iodine numbers of 170-190 mg/g and DBP absorption value of 130-160 cc/100 g are preferred in ultra high performance tire treads. An example of such a carbon black is HV-3396 from Witco Chemical which has an iodine number of about 185 and a DBP of about 140-145.

The carbon blacks may be in pelletized form or an unpelletized flocculent mass. Preferably, for more uniform mixing, unpelletized carbon black is preferred.

It has been discovered that it is possible to include large amounts of carbon black in the elastomer compositions used in the invention. Up to about 250 parts of carbon black can be included per 100 parts of copolymer (A). Loadings of from 50 to 250 parts of carbon black per 100 parts of copolymer are often used to obtain desirable properties.

The elastomer compositions comprising the blends of copolymer, oil, and carbon black can be prepared by any of the techniques known to those skilled in the art. For example, the blends can be prepared on roll mills or in internal mixers such as a Banbury mixer. When it is desired to prepare elastomer compositions containing high amounts of oil, the oil may be blended with the copolymer with incremental additions of the oil or with a single addition of the oil. Alternatively, the oil can be added to a latex of the copolymer or a portion of the oil added to the copolymer initially and additional oil added during blending with other additives.

When curing agents are mixed with the elastomer compositions, they may be conventional types such as sulfur- or peroxide-based curing systems. They are used in conventional amounts and incorporated in the uncured compositions of the invention by known techniques and procedures. Fillers (in addition to carbon black) may be, and often are present as is known to those skilled in the art. Typical fillers include glass, talc, silica ("white carbon black") and similar finely divided mineral materials. In addition to the fillers, other materials normally used in conventional rubber formulations such as antioxidants, accelerators, retarders, promoters and the like may be incorporated into the vulcanizable elastomer compositions used to prepare tire treads.

The vulcanizable (curable) compositions containing the elastomer compositions can be prepared by conventional techniques using various types of mills, blenders and mixers known in the art. The cured compositions can be made by the same techniques followed by curing.

The temperature used in formulating the rubber compositions of this invention range from ambient to those normally used in the art such as 75°-175° or even higher depending upon a particular modified rubber composition being processed. Because of the shear force involved in formulating the rubber compositions, the formulation process is exothermic and high temperatures are normal.

A general and a typical compounding recipe for preparing the vulcanizable elastomer compositions useful in preparing the high performance tire treads of this invention are shown in the following Table VI.

TABLE VI

| | Compounding Recipe | |
|---|---|---|
| | PHR | |
| Ingredient | General | Typical |
| Polymer | | |
| Other | 0-90 | Total 100 |
| Copolymer A | 100-10 | |
| Carbon Black | 50-250 | 150 |
| Oil* | 30-250 | 90 |
| Stearic Acid | 1-5 | 2 |
| Zinc Oxide | 3-10 | 3 |
| Antioxidant | 1-3 | 2 |
| Sulfur | 0.5-5 | 1.5 |

TABLE VI-continued

| | Compounding Recipe PHR | |
|---|---|---|
| Ingredient | General | Typical |
| Accelerator | 5-.5 | .6 |

*Sum of extender oil and oil added during kneading

The tire tread vulcanizates of the present invention are made by vulcanizing a mixture comprising at least one of the elastomer compositions of the invention, fillers, conventional curing systems and agents such as sulfur, antioxidants, accelerators, retarders, coupling agents, promoters, etc. The vulcanizates are prepared by curing these compositions under conditions of temperature and time customarily used in the art. Typically, the elastomer composition including carbon black and other fillers are mixed, the sulfur and accelerators are added, and the mixture is cured. Other mixing sequences can be used, but it is essential to have the copolymer and carbon black product intimately combined before vulcanization.

The following examples illustrate the preparation of curable and cured elastomer compositions useful in preparing the tire treads of the present invention. An internal mixer such as a Brabender or small size Banbury, and a roll mill are used to prepare the uncured rubber formulations in accordance with techniques well known to those skilled in the art.

The Lambourn abrasion resistance of the elastomer compositions may be evaluated in the laboratory in the following manner:

First, a time at which the torque of the elastomer composition takes the maximum value is measured by a rheometer, and vulcanization is carried out for a time 1.2 times as long as thus measured time. Then, the Lambourn abrasion of the vulcanized elastomer composition is evaluated at a given wear rate (e.g., 25%) under load of 4.5 kg, and shown by index taking a value a Control as 100. The larger the index, the better the Lambourn abrasion resistance.

The viscoelastic properties of the cured compounded elastomers of the invention and several control examples are determined using a dynastat mechanical spectrometer tester available from IMASS Inc., Accord, Mass. 02018. The test is conducted at 1.000 Hz at room temperature. Values are reported in the following tables as M', and the unit is MPa.

EXAMPLE I AND CONTROLS 4-5

The components and formulation used in the preparation of the curable compounded elastomers are summarized in the following Table VII.

TABLE VII

| Components* | Example I | Control-4 | Control-5 |
|---|---|---|---|
| Copolymer Ex. 10 | 100 | — | — |
| Control-1 | — | 100 | — |
| Control-2 | — | — | 100 |
| Carbon Black (ISAF) | 95 | 95 | 95 |
| Aromatic Oil | 65 | 65 | 65 |
| Zinc Oxide | 3.0 | 3.0 | 3.0 |
| Stearic Acid | 1.0 | 1.0 | 1.0 |
| Accelerator | 0.8 | 0.8 | 0.8 |
| Sulfur | 1.7 | 1.7 | 1.7 |

*parts by weight

The compositions of Example I and Controls 4 and 5 are cured by heating at 160° C. for 20 minutes. Some properties of the cured elastomers are summarized in Table VIII.

TABLE VIII

| Properties | Example I | Control-4 | Control-5 |
|---|---|---|---|
| Tests at Room Temp. | | | |
| Shore A Hardness | 62.0 | 54.0 | 57.0 |
| Tensile (psi) | 3136 | 2692 | 2848 |
| 300% Modulus (psi) | 1058 | 917 | 881 |
| Tan delta | 0.378 | 0.338 | 0.338 |
| M' (MPa) | 8.94 | 5.46 | 5.40 |
| Tests at 100° C. | | | |
| Shore A Hardness | 49.0 | 47.0 | 44.0 |
| Tensile (psi) | 1538 | 1268 | 1442 |
| 300% Modulus (psi) | 679 | 688 | 582 |

EXAMPLE II AND CONTROL-6

The components and formulation used in the preparation of the curable compounded elastomers are summarized in Table IX.

TABLE IX

| Components* | Example II | Control-6 |
|---|---|---|
| Copolymer Example 10 | 100 | — |
| Control 3 | — | 100 |
| Carbon Black | 80 | 80 |
| Aromatic Oil | 47 | 47 |
| Zinc Oxide | 2.0 | 2.0 |
| Stearic Acid | 2.0 | 2.0 |
| Accelerator | 1.2 | 1.2 |
| Sulfur | 1.8 | 1.8 |

*Parts by weight

The compositions of Example II and Control-6 are cured by heating at 170° C. for 15 minutes. Some properties of the cured elastomers are shown in Table X.

TABLE X

| Properties | Example II | Control-6 |
|---|---|---|
| Tests at Room Temperature | | |
| Shore A Hardness | 61.0 | 63.5 |
| Tensile (psi) | 3012 | 2827 |
| 300% Modulus (psi) | 987 | 874 |
| Tan delta | 0.315 | 0.293 |
| M' (MPa) | 8.40 | 9.17 |
| Lambourn Wear 25% | 110 | 100 |
| % rebound | 22.5 | 29.6 |
| Tests at 100° C. | | |
| Shore A Hardness | 48.0 | 52.9 |
| Tensile (psi) | 2059 | 1816 |
| 300% Modulus (psi) | 711 | 751 |

Among the desirable and beneficial properties which may be obtained with tire treads made with the vulcanized elastomer compositions containing the ultra high molecular weight copolymers described herein are high hysteresis (tan delta), low modulus, low durometer, better reversion, and increased wear and traction. Low modulus and low durometer are observed particularly when larger amounts of oil are included in the elastomer compositions. The vulcanizable and vulcanized elastomer compositions based on the use of the ultra high molecular weight copolymers can be molded or shaped to the desired tire treads by known techniques. The tread can be applied during the building of the green tire in which an uncured, shaped tread of the formulation of the present invention is built into the carcass following which the green tire is shaped and cured. Alternatively, the tread can be applied to a cured tire carcass from which the previous tread has been buffed or abraded away and the uncured, shaped tread of the present invention cured thereon as a retread. Tires gripping ability and, furthermore, possesses very good balance between the hysteresis loss value as an indication of the road gripping ability and other important characteristics such as rupture strength, heat resistance and wear resistance which are required for tires to be used under very severe conditions.

As tire tread material, the elastomer compositions of the invention are useful in high performance tires for specialized utilities and for general purposes. The invention is applicable to both automobile and motorcycle tires.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A high performance tire comprising a tread made of a vulcanizable elastomer composition comprising an ultra high molecular weight copolymer composition of a 1,3-conjugated diene and an aromatic vinyl compound having a weight average molecular weight of greater than about 1,000,000 and a vinyl content in the butadiene base of from 30–80% by weight.

2. The tire of claim 1 wherein the weight average molecular weight of the copolymer is greater than 1,100,000.

3. The tire of claim 1 wherein the intrinsic viscosity in tetrahydrofuran of the copolymer is at least about 4.0.

4. The tire of claim 1 wherein the dilute solution viscosity in toluene of the copolymer composition is at least about 3.5 dl/g.

5. The tire of claim 1 wherein the copolymer comprises at least 30% by weight of a high molecular weight copolymer fraction having a number average molecular weight of greater than 1,000,000 and less than about 8% by weight of a low molecular weight copolymer fraction having a number average molecular weight of less than 100,000.

6. The tire of claim 1 wherein the copolymer comprises from about 50 to about 90% by weight of the conjugated diene and from about 10 to about 50% by weight of the aromatic vinyl compound.

7. The tire of claim 1 wherein the copolymer contains at least 30% by weight of bound aromatic vinyl compound.

8. The tire of claim 1 wherein the Tg of the copolymer is at least about −55° C.

9. The tire of claim 1 wherein the conjugated diene is 1,3-butadiene, isoprene or piperylene.

10. The tire of claim 1 wherein the aromatic vinyl compound is a styrene.

11. The tire of claim 1 wherein copolymer is obtained by polymerizing a conjugated diene and an aromatic vinyl compound in the presence of a catalyst comprising a trimetalated 1-alkyne obtained by reacting, at a temperature above about 70° C., a 1-alkyne containing at least 4 carbon atoms, an organometallic compound $R^oM$ and a 1,3-conjugated diene wherein, the alkyne is characterized by the formula $\quad RCH_2C \equiv CH \quad$ (II)

wherein R is an alkyl group, $R^o$ is a hydrocarbyl group, M is an alkal metal, the mole ratio of $R^oM$ to 1-alkyne is about 3:1, and the mole ratio of conjugated diene to 1-alkyne is from about 2:1 to about 30:1.

12. The tire of claim 11 wherein the alkali metal M is lithium.

13. The tire of claim 11 wherein R is an alkyl group containing from 1 to about 15 carbon atoms.

14. The tire of claim 11 wherein the 1-alkyne is 1-octyne.

15. The tire of claim 1 wherein the copolymer composition is a copolymer of a 1,3-conjugated diene selected from the group of 1,3-butadiene, isoprene or piperylene and a styrene compound prepared by polymerizing a mixture comprising the diene, a styrene compound, a trilithiated 1-alkyne catalyst and a hydrocarbon solvent wherein the catalyst is obtained by reacting a 1-alkyne containing at least 4 carbon atoms, an organolithium compound and an aliphatic 1,3-conjugated diene at a temperature of at least 70° C. wherein the mole ratio of organolithium to 1-alkyne is about 3:1 and the mole ratio of conjugated diene to 1-alkyne is from about 3:1 to about 30:1.

16. The tire of claim 1 wherein the vulcanizable elastomer composition also contains from about 30 to about 300 parts by weight of oil per 100 parts by weight of copolymer.

17. The tire of claim 16 wherein the oil is at least one naphthenic, paraffinic or aromatic oil or mixtures thereof.

18. The tire of claim 1 wherein the vulcanizable elastomer composition also contains up to 250 parts of at least one carbon black.

19. A high performance tire comprising a tread made of a vulcanizable elastomer composition comprising (A) an ultra high molecular weight copolymer composition of at least one 1,3-conjugated diene selected from the group consisting of 1,3-butadiene, isoprene or piperylene and a styrene compound wherein the copolymer has a weight average molecular weight of at least about 1,000,000 and a vinyl content in the butadiene base of about 30–80% by weight and wherein the copolymer is prepared by polymerizing the 1,3-conjugated diene and the vinyl aromatic compound in a hydrocarbon solvent in the presence of a trimetalated 1-alkyne catalyst which comprises the reaction product of a 1-alkyne containing at least 4 carbon atoms, an organometallic compound $R^oM$ and a 1,3-conjugated diene prepared at a temperature of at least about 70° C., and wherein $R^o$ is an aliphatic or cycloaliphatic group, M is an alkali metal, the mole ratio of $R^oM$ to 1-alkyne is about 3:1, and the mole ratio of conjugated diene to 1-alkyne is from about 2:1 to about 30:1;

(B) from about 50 to about 300 parts by weight of oil per 100 parts of copolymer (A); and (C) from about 50 to about 250 parts by weight per 100 parts of copolymer (A) of at least one reinforcing carbon black.

20. The tire of claim 19 wherein the elastomer composition contains at least about 80 parts by weight of oil per 100 parts of copolymer (A).

21. The tire of claim 19 wherein the elastomer composition contains at least about 100 parts of the carbon black.

22. The tire of claim 19 wherein the copolymer (A) comprises from about 50 to about 70% by weight of 1,3-butadiene and about 30% to about 50% of the styrene compound.

23. The tire of claim 19 wherein the oil is an aromatic oil.

24. The tire of claim 19 wherein the carbon black is a high structure carbon black having a surface area of at least about 80 m²/g.

25. The tire of claim 1 wherein the Mw/Mn of the ultra high molecular weight copolymer is from 2.0 to 5.0.

26. The tire of claim 1 wherein the Mw/Mn of the ultra high molecular weight copolymer is from 2.5 to about 5.0.

27. The tire of claim 1 wherein the vinyl content in the butadiene base of the ultra high molecular weight copolymer composition is from 60 to 80% by weight.

28. The tire of claim 19 wherein the vinyl content in the butadiene base of the ultra high molecular weight copolymer composition is from 60 to 80% by weight.

* * * * *